United States Patent
Aklepi et al.

(10) Patent No.: US 6,795,823 B1
(45) Date of Patent: Sep. 21, 2004

(54) CENTRALIZED SYSTEM AND METHOD FOR OPTIMALLY ROUTING AND TRACKING ARTICLES

(75) Inventors: Alex Aklepi, Miami, FL (US); Vladimir Lebedev, Hallandale, FL (US); Johnny R. Marmol, Miami, FL (US); Raphael Nagli, Aventura, FL (US); Naveed Ahmed, Boca Raton, FL (US); Pavel V. Cherenkov, Sunny Isles Beach, FL (US); Andrey V. Miagkov, Hallandale, FL (US); Eugene S. Kouroptev, Miami, FL (US)

(73) Assignee: Neoris Logistics, Inc., Miami, FL (US)

( * ) Notice: Subject to any disclaimer, the term of this patent is extended or adjusted under 35 U.S.C. 154(b) by 491 days.

(21) Appl. No.: 09/652,948

(22) Filed: Aug. 31, 2000

(51) Int. Cl.[7] .............................................. G06F 17/30
(52) U.S. Cl. ............................ 707/10; 707/1; 709/238; 709/239; 709/242
(58) Field of Search ....................... 707/10, 1; 709/238, 709/239, 242

(56) References Cited

U.S. PATENT DOCUMENTS

| | | | |
|---|---|---|---|
| 4,630,216 A | 12/1986 | Tyler et al. | |
| 5,043,908 A | 8/1991 | Manduley et al. | |
| 5,072,400 A | 12/1991 | Manduley | |
| 5,869,819 A | 2/1999 | Knowles et al. | |
| 6,047,264 A | 4/2000 | Fisher et al. | |
| 6,069,895 A | * 5/2000 | Ayandeh | 370/399 |
| 6,073,114 A | 6/2000 | Perkins, III et al. | |
| 6,094,642 A | 7/2000 | Stephenson et al. | |
| 6,564,216 B2 | * 5/2003 | Waters | 707/10 |

FOREIGN PATENT DOCUMENTS

| | | | |
|---|---|---|---|
| GB | 2 332 540 A | 6/1999 | |
| WO | WO 99/33040 | 7/1999 | |
| WO | WO 00/46728 | 8/2000 | |
| WO | WO 02/19046 A1 | * 3/2002 | G05B/19/05 |

* cited by examiner

Primary Examiner—Greta Robinson
Assistant Examiner—Debbie M. Le
(74) Attorney, Agent, or Firm—Sidley Austin Brown & Wood LLP (57) ABSTRACT

A computer-implemented centralized article routing and tracking system and method for optimally routing an article through a network of processing stations. The system and method generate an optimal route based on variable factors such as weather, traffic, and available equipment and can re-calculate said route at every stop based on updated information. The system and method permits tracking of an article regardless of whether the article has been consolidated with other articles or not.

30 Claims, 2 Drawing Sheets

CENTRALIZED SYSTEM AND METHOD FOR OPTIMALLY ROUTING AND TRACKING ARTICLES

FIELD OF INVENTION

The present invention relates generally to article processing and delivery, and specifically to a computer-implemented method and system for optimally routing an article through a network of processing, delivery and routing stations, centrally tracking the location, controlling, and routing the article within the network either individually or as part of a group of articles.

BACKGROUND OF THE INVENTION

More so today than at any time in the past, businesses and consumers require more efficient, flexible, and economic methods for transportation and delivery of articles such as raw materials, manufactured goods, packages, parcels and parts. Today's retailers, wholesalers and manufacturers make use of advanced "supply-chain" models to maintain minimal inventories and "work in progress", make maximum use of limited warehousing and storage capabilities, and in the process reduce costs while maintaining output capabilities sufficient to meet changing demand. In order to fully realize the benefits of these modern logistics and manufacturing models, businesses require systems which minimize transit times, allow for maximum control of goods (i.e., the ability to re-route and hold articles in transit) and permit up-to-the-minute tracking of articles. In addition, in order to minimize transportation and translocation costs, it is beneficial to have the ability to consolidate or de-consolidate groups of articles while in transit without loosing the ability to track and route articles individually. It is also important for businesses to have accurate information regarding estimated production, delivery and pick up times for articles, to be able to adjust such times to meet production requirements and to have "end to end" accountability of shipments in transit.

In a manufacturing setting, it is also necessary to maintain complete control over the tracking and routing of parts, assemblies, raw materials and other articles as they flow through a production process. Important characteristics of a routing and tracking system for use in a manufacturing situation include the ability to account for and divert parts and partial assemblies to locations in the manufacturing process where they are needed the most. Additionally, such a system must be able to accurately track Work-In-Process in order to actually project production throughput and timing for finished goods. In some industries such as pharmaceuticals, medical device manufacturing and aircraft parts manufacturing, such a system may play an integral role in tracking parts, assemblies or materials for regulatory related purposes. The manufacturing settings in question can be contained within a single building or be spread out geographically and any tracking a routing system used must be flexible enough to allow for either situation or a combination thereof.

In addition to their own manufacturing and supply chain needs, businesses require similar routing, tracking and control features for shipments whose ultimate recipient is a customer, whether it be a consumer or another business. In order to increase customer satisfaction and gain a competitive advantage, suppliers and retailers need to be able to provide the most accurate real time or near real time information regarding the location of an article, and the ability to re-route articles on an item or container basis.

From the consumer standpoint, modern retailing channels, such as mail-order catalogs, broadcast media, and the Internet, have increasingly relied on deliveries to allow purchasing of goods without the necessity of physically visiting traditional "brick and mortar" retail locations. In order to induce more consumers to utilize remote or virtual purchasing channels, it is imperative that delivery options be as convenient as possible and that they approach the options available to buyers in physical stores. It is important for consumers to be able to determine the exact location of an order and to be able to modify shipment routings to suit their convenience. It is also desirable to minimize delivery times by optimizing article delivery routes interactively and in real time based on timely updated fast-changing conditions such as traffic, available equipment, regional weather, etc.

Previous attempts have been made to provide methods for moving delivering, tracking or routing articles as described in U.S. Pat. No. 6,094,642 to Stephenson et al. (hereinafter "the '642 patent"); U.S. Pat. No. 5,043,908 to Manduley et al. (hereinafter "the '908 patent"); U.S. Pat. No. 6,047,264 to Fisher et al. (hereinafter "the '264 patent"); U.S. Pat. No. 4,630,216 to Tyler et al. (hereinafter "the '216 patent"); and U.S. Pat. No. 6,073,114 to Perkins, III et al. (hereinafter "the '114 patent"); all of which are incorporate herein by reference.

The '642 patent describes an integrated data collection and transmission system and method for collecting and transmitting data related to package delivery. The system and method utilize various components that are commonly connected via one or both of an infrared communications link and a microradio link. This system is limited in that it only provides tracking capabilities and no routing, re-routing, optimization or consolidation features.

The '908 patent describes a system for monitoring the delivery of mail pieces passing through multiple stages in a delivery network. The system relies on the application of a unique tracking ID to each piece of mail entering the network and associating with each such piece a set route and scheduled arrival times and dates at each stop along said route. The ID and corresponding schedule is stored in a central database maintained in a computer which is capable of querying local computers at each delivery stop. Upon arrival at each stop along its prescribed route, a mail piece's ID is recorded and an actual arrival time and date is entered into a local database maintained in said local computers. Periodically, the central computer queries all local stations for presence of a particular item. If an item fails to arrive at a delivery stop on schedule, or is delivered to an incorrect stop, an alarm is triggered which prompts an action within the system to locate a lost item and to expedite its delivery when, and if, it is located.

Because the system described by the '908 patent assigns a predetermined route to a mail piece upon entry into the delivery network, it can neither account for changing conditions nor change the route of a shipment on that basis. In addition, this system does not permit consolidation or de-consolidation of items in transit or tracking on an item-level basis for mail pieces grouped together for delivery to a common address. Finally, this system only allows for changes to the route of a mail piece when an alarm is triggered and does not permit changes to the final destination of the mail piece. Therefore this system does not provide complete control over delivery of items within it nor does it optimize the delivery route.

The '264 patent describes a method for automatically generating and transmitting e-mail messages to customers appraising them of tracking events related to their in-transit packages. The invention disclosed by the '264 patent is directed at merchants who ship goods to customers via common carriers who, in turn, track packages by referring to a unique tracking identification number. This invention allows customers to automatically receive updates, via e-mail, regarding the location of packages after they have been shipped by the merchant. Because it is merely a notification system the invention described in the '264 patent does not account for conditions affecting routing or delivery nor can it change, or in any way control, the route of a shipment on that, or any other, basis. In addition, the system does not permit consolidation or de-consolidation of items. Therefore this system also does not provide any control over delivery of items within it nor their delivery routes.

The '216 patent describes a computer-controlled conveying system for use in transporting materials between different locations. The system includes a plurality of carriages for receiving and holding the materials and a track along which the carriages move in transporting the materials. Each of the carriages has a unique identifier, which is used by a system controller to monitor and control the movement of the carriage. A number of transfer units, and corresponding transfer unit controllers, are provided along the track. The transfer unit controllers communicate with a system controller and, in conjunction with the transfer units and information received from the system controller, act to provide the desired path for end of the carriages. This system, however, only deals with fixed routes that do not require adjustment to compensate for variable conditions. In addition, routing in this system cannot be optimized and the system cannot track articles on an item-level basis but only on the basis of an entire carriage(s) load. Moreover, this system does permit tracking of consolidated shipments or de-consolidation of items from a particular carriage without loosing tracking information.

The '114 patent describes a method for tracking timber and other commodities from the time they are harvested through the time of delivery to its ultimate purchaser. This system makes use of discrete memory devices which are attached to the sides of trucks used to transport the timber. The memory devices may be read and written to by a computer through a field terminal device. Through a field terminal device, a forester transmits all information regarding a particular load of timber immediately after it is cut and loaded on a truck. The information stored can include details about the timber (size of logs, number of logs, etc.) the name of the owner of the logs and handling instructions. At each transit step before ultimate delivery of the timber, the data from the data device is read and recorded on a local personal computer and a new record is written to the data device which may contain new information which can be used to ensure that the timber is routed to the correct location, handled properly, and that no timber is diverted from a truck load. Different transit locations have different capabilities to write and extract information to/from the memory device and to generate reports from such information. This method is limited in that the computers at the different transit locations are not networked and the reports and logs generated by each computer must be manually transmitted via diskettes or e-mailed in order to fully integrate all the data generated. Accordingly, the method operates more as a report-generation tool and "after the fact" control than a real-time tracking tool. Moreover, this system does not include any routing features, optimized or otherwise, as it is completely decentralized and all routing decisions are made prior to entry of an item into the system. The system is not capable of automatically routing or re-routing a load based on changing conditions nor does it allow consolidation and de-consolidation of items in a load or loads.

None of the inventions mentioned above describe a system for routing an article through a process delivery network which permits repeated re-optimization of a delivery route based on constantly updated conditions, complete control over the delivery date, time and location of the article, consolidation and de-consolidation of articles, and real-time or near real-time tracking of individual articles by using a centralized database which is easily accessible by all parties interested in the status of articles.

Therefore, there is a need in the art for a more flexible, powerful and efficient system and method of routing and tracking articles by calculating an optimized delivery route using timely information regarding available equipment, available warehouse or storage space, a desired delivery date, traffic delays, weather, and other variables, and re-optimizing the route based on updated conditions after each stop along the delivery network.

There is a further need in the art for a system and method for routing articles which permits consolidation of articles from multiple origination points and a common destination address, or, conversely, de-consolidation of articles from a single origination point and multiple destination addresses, while retaining the ability to track articles individually or as part of the consolidated unit.

There is a further need in the art for a system and method for tracking and re-routing articles interactively through an electronic communications network by allowing a user to search a central database for tracking information on an article, whether it is an individual item or part of a group of consolidated articles, using a single unique identification number.

There is a further need in the art for a system and method for tracking and routing articles which allows the user to identify articles while in transit or processing and manually change their routing, specify required stops, alter their final destination, and otherwise control delivery of said articles prior to arrival at their final destinations.

Finally, there is a yet a need in the art for a system and method for tracking and routing articles which automatically detects when an article has been misdirected and re-calculates an optimal routing to the correct destination without requiring the article to "backtrack" to the last correct stop.

SUMMARY OF THE INVENTION

The present invention solves significant problems in the art by providing a computer-implemented system and method for routing a articles through a delivery network which permits repeated re-optimization of delivery routes based on timely updated conditions, complete control over the delivery dates, times and locations of the articles, consolidation and de-consolidation of articles, and real-time or near real-time tracking of individual or grouped articles by using a centralized database which is easily accessible by all parties interested in the status of the articles.

Generally described, the computer-implemented centralized system for optimally routing and tracking articles comprises a global computer server accessible through an electronic communications network, the global server comprising: a global database containing a record of routing and tracking information for each article handled by the system; an optimizer for calculating, and periodically re-calculating, an optimal route for each article handled by the system and for updating the global database with changes to the routing and tracking information; a database of route optimization factors accessible by the optimizer for use in the calculation and re-calculation of the optimal route; a tracker enabling users of the system to review the tracking and routing information and to modify the route optimization factor database; a plurality of processing stations arrayed throughout a delivery area for the system; at each such processing station, a local computer server capable of periodically receiving from the global computer server identification, handling and routing instructions for each article to be processed at the processing station and periodically transmitting to the global computer server information regarding all handling activities performed on articles processed at the processing station; at each such processing station, one or more handheld scanning devices capable of receiving from the local computer server article identification information, handling instructions and routing information, and also being capable of collecting identification and handling activity information for each article received at each the processing station and transmitting the identification and handling activity information to the local computer server; and transportation means capable of transporting articles between and among the processing stations, article origination points and article destination points.

Generally described, the computer-implemented method for delivering packages through a centrally optimized tracking and routing system of the present invention comprises the steps of, receiving a package at one of a plurality of processing stations arrayed throughout a delivery area, using a first handheld scanner to collect package identification and final destination data from said package, transmitting said package identification and final destination data along with scanning time and date data to a local computer server, periodically uploading said identification, time, date and final destination data, along with processing station identification data to a global computer server at a centralized location, at said global computer server, incorporating the uploaded information into a global database, calculating an optimal route along the several processing stations for said package based on its current location, final destination and several variable factors, determining whether said optimal route requires the package to be transported to a next processing station or directly to its final destination, updating the record for said package in said global database with said identification information for said next processing station or final destination, downloading said package record information to the local computer server at the processing station where the package is located, transmitting said downloaded package record to said handheld scanner or a second handheld scanner at said processing station, scanning said package to obtain identification information, displaying the next station or final destination identification information for said package, placing the package inside transportation means, such as a truck, and transporting the package to said next processing station or final destination, if the package is transported to a next processing station, repeating the above steps until the package is delivered at its final destination, once the package is transported to its final destination, scanning said package with said first or second handheld scanners or a third handheld scanner immediately prior to delivery and inputting into said handheld scanner delivery information for said package, transmitting said delivery information to the last processing station which processed the package, and uploading said delivery information to said global computer server.

Accordingly, it is an object of the present invention to provide a more flexible, powerful and efficient system and method of routing and tracking articles by calculating an optimized delivery route using timely information regarding available equipment, available warehouse capacity, a desired delivery date, traffic delays, weather, and other variables, and re-optimizing the route based on updated conditions after each stop along the delivery network.

It is a further object of the present invention to provide a system and method for routing articles which permits consolidation of articles from multiple origination points and a common destination address, or, conversely, de-consolidation of articles from a single origination point and multiple destination addresses, while retaining the ability to track articles individually or as part of the consolidated unit.

It is a further object of the present invention to provide a system and method for tracking and re-routing articles interactively through an electronic communications network by allowing a user to search a central database for tracking information on an article, whether it is an individual item or part of a group of consolidated articles, using a single unique identification number.

It is a further object of the present invention to provide a system and method for tracking and routing articles which allows the user to identify articles while in transit and manually change their routing, specify required stops, alter their final destination, and otherwise control delivery of said articles prior to arrival at their final destinations.

It is a further object of the present invention to provide a system and method for tracking and routing articles which automatically detects when an article has been misdirected and re-calculates an optimal routing to the correct destination without requiring the article to "backtrack" to the last correct stop.

These and other objects, features and advantages of the present invention may be more clearly understood and appreciated from a review of the following summary of the invention, detailed description of the disclosed embodiments and by reference to the appended drawings and claims.

DETAILED DESCRIPTION OF THE PREFERRED EMBODIMENT

Figure 1:
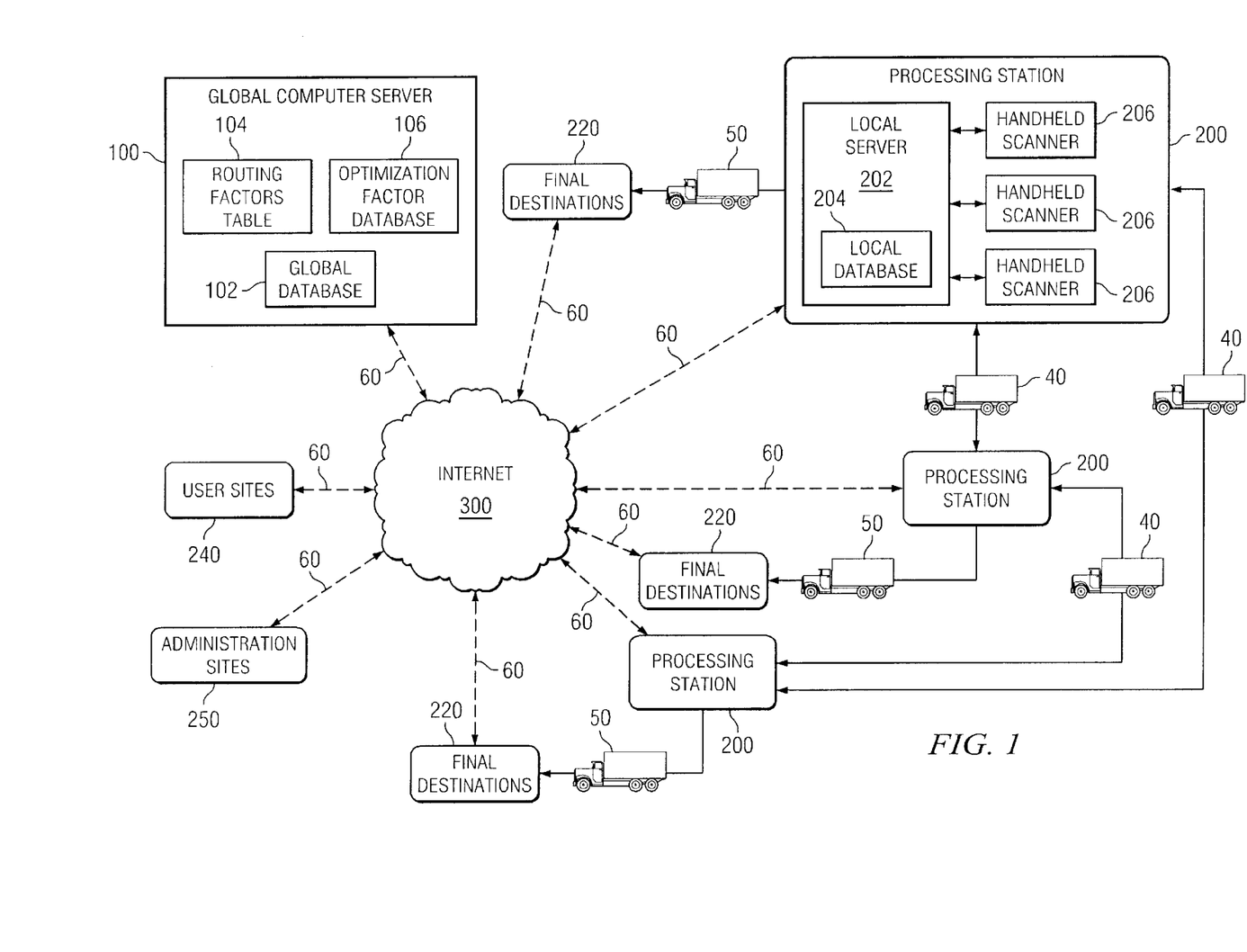
FIG. 1 is a block diagram illustrating major components and connections thereof of the centralized package routing and tracking system of the present invention.

Referring initially to FIG. 1 of the drawings, in which like numerals indicate like elements throughout the several views, major components and connections thereof of the centralized package routing and tracking system of the present invention include a global computer server 100 containing a global database 102 of routing and tracking information for articles handled by the system, a routing factors table 104 containing information used by the global computer server 100 to create optimized routing instructions, and an optimization rules table 106 which contains information regarding how optimization factors are applied to each article. The global computer server 100 is connected to other components in the system via a communications link 60 to an electronic communications network, such as the Internet 300. The electronic link 60 between the global computer server 100, as well as other components in the system, and the Internet 300 may consist of a telephone connection through a modem, a DSL line, an ATM connection, an ISDN connection, a satellite linkup, or any other standard method of network connection. In addition, although the Internet is used in the preferred embodiment of the present invention, other types communications networks can be used to implement the invention with similar results.

A plurality of processing stations 200 is arrayed throughout the geographic area covered by the system. Each processing station 200 is equipped with a local server 202 which in turn contains a local database 204 for temporary storage of routing and tracking information received from, and transmitted to, the global computer server 100. Connected to the local server 202 at each processing station 200 are one or more handheld scanners 206 which are used to retrieve information from articles processed by the system, to retrieve routing and tracking information from the local server 202, and to transmit tracking and routing information to the local server 202 for later transmission to the global server 100. The connection between the handheld scanners 206 and the local server need not be permanent and may be achieved by using physical connections, such as cables or synchronization cradles, or wireless interfaces such as radio frequency (RF) or infrared (IR) transmission. The processing station 200 is connected to the global computer server 100 system via a communications link 60 to an electronic communications network, such as the Internet 300.

Each processing station 200 is connected via one or more physical transportation route 40 to one or more processing stations 200 for transfer of articles between stations. Each processing station 200 may also be connected via one or more physical transportation route 50 to a final destination 220 for final delivery of articles.

Authorized users of the system may access, and interact with, the global database 102 by connecting to the global computer server 100 through the Internet 300 via a communications link 60 from either a user site 240, a final destination 220 or a processing station 200. A system administrator may access, and interact with, the global database 102 and may make revisions or updates to the routing factors table 104 based on new conditions, by connecting to the global computer server 100 through the Internet 300 via a communications link 60 from either an administrator site 240 or a processing station 200.

Figure 2:
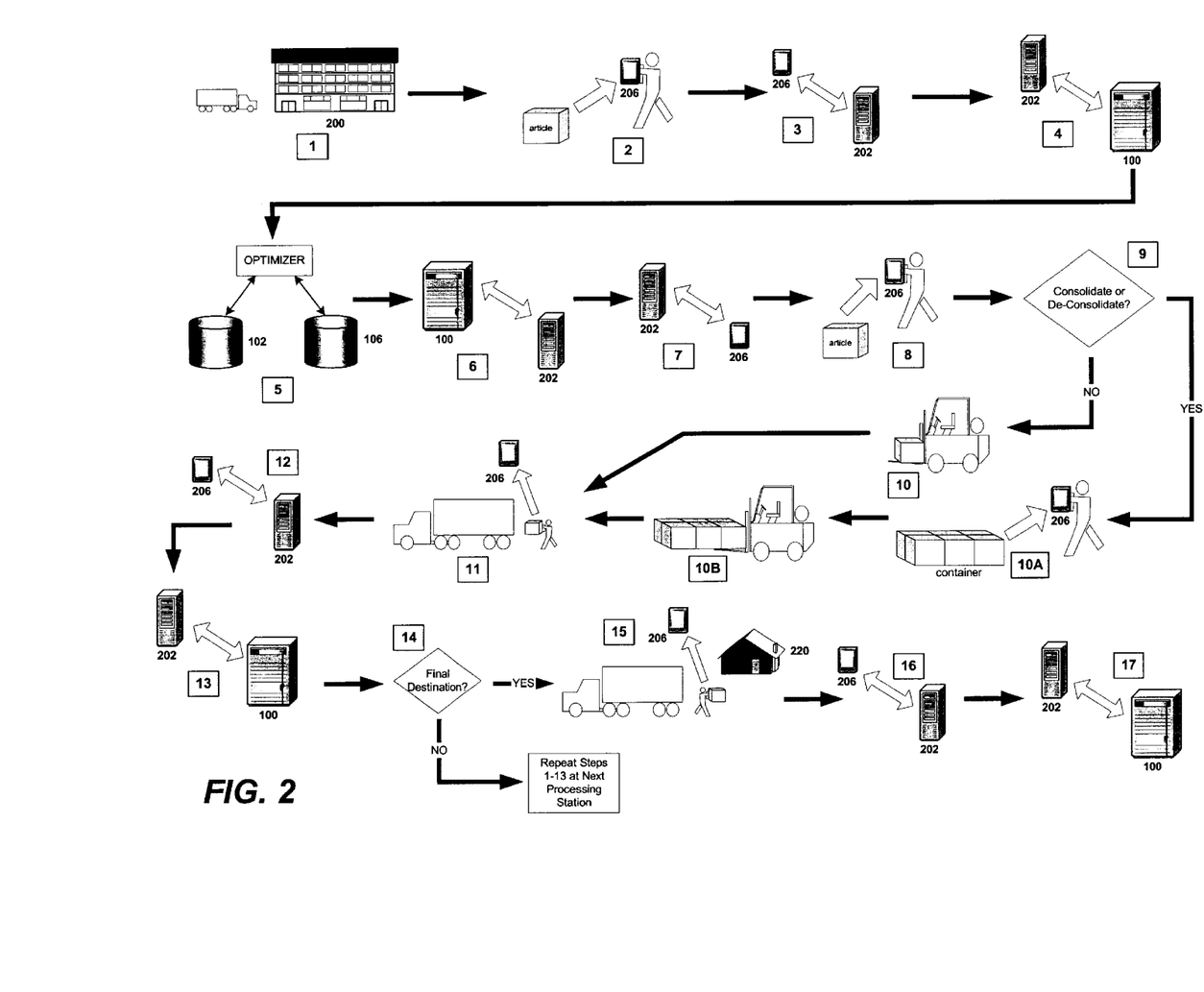
FIG. 2 is a diagram illustrating the steps in a system implementing a preferred embodiment of the present invention.

A diagram depicting the steps involved in the typical application of a preferred embodiment of the present invention is shown in FIG. 2. The sequence begins at step 1 when the article to be tracked is delivered to the initial processing station. Prior to arrival to the processing station or upon receipt at said processing station, an identification number and final destination is incorporated into the article either by the sender or by personnel at the processing station. In step 2, the identification number and final destination on the article are read and recorded using a handheld scanner and, subsequently, in step 3, the handheld scanner is synchronized with the local server at the processing station. Upon synchronization, the article's information is transferred from the handheld scanner to the local server. Similarly, during synchronization, any new information in the local server about articles in process or to be processed by the processing station is transferred to the handheld scanner. In step 4, after the handheld scanner is synchronized, the local server similarly synchronizes itself with the global computer server by transferring to the global server all new information about all articles, including the subject article, received or handled by the processing station. Upon synchronization, the global computer server looks up the record for the article using its identification number and if no record is found, as is the case with new articles, a new record is created for the article in the global database. In step 4, the global computer server also transfers to the local server any new information from the global database about packages to be processed at the subject processing station. In step 5, the optimizer software at the global computer server calculates an optimal route for the article from its present location to its final destination. This optimization is carried out using a route optimization algorithm which makes use variables from the route factors table and the routing rules table stored at the global server. The optimization rules for new articles are set in a default configuration and may be modified by authorized users of the system who wish to adjust routing of the article.

After an optimized route is calculated, the subject article's record in the global database is updated with the identifier for the next processing station along the optimal route, or, if applicable based on the optimal route, with the final destination. In step 6, the global computer server and local server are again synchronized and in step 7 a handheld scanner at the processing station is synchronized with the local server. In step 8, the next time the article is scanned by a handheld scanner at the processing station, the scanner displays to the scanner operator the identifier for the next stop along the route and a "gate" within the processing station designated for a truck, or other transportation means, which is scheduled to travel to the next stop. A gate assignment designates not only a physical location within the processing station but also may include a pick up time and a particular delivery vehicle. Prior to transferring the article to its assigned gate, in step 9 the operator of the system may make an inquiry as to whether the article is to be consolidated into a container or deconsolidated from one prior to beginning the next leg of its route. If no consolidation is desired, in step 10, the article is transported to its assigned gate at the processing station. If consolidation is desired, the article is physically consolidated into a container in step 10A. Upon consolidation, the article and container are scanned by handheld scanner and the container's identifier is associated with the article record contained in the handheld scanner. Then, in step 10B, the container is transported to its assigned gate at the processing station.

When the article or container arrives at its gate, in step 11 it is once again scanned at the gate, loaded onto the truck assigned to that gate, and the truck proceeds to the next stop along the articles route. After the article is loaded and scanned, in steps 12 and 13, the handheld scanners involved in handling of the article are synchronized with the local server and the local server is synchronized with the global computer server. At the global computer server, the record for the article in question is updated with the new handling information and, if applicable, a container number is added to the record. Proceeding to step 14, if after step 11 the article is en-route to another processing station, then upon arrival at that processing station, steps 1 to 13 are repeated until the next stop in the optimized route for the article is its final destination. If an article is en-route to its final destination after step 11, in step 15, upon arrival at the final destination, the article is scanned using a handheld scanner and delivery information is recorded in the scanner. Upon the delivery vehicle's return to the processing station, in step 16 the handheld scanner is synchronized with the local server. Finally, in step 17, the local server is synchronized with the global computer server which incorporates all new handling and delivery information and closes the global database record for the subject article.

In the preferred embodiment of the present invention, an optimal route for each article can re-calculated every time the article is received at an intermediate processing station. The factors considered in determining the optimal route for an article, and therefore the next processing station along said route, include, without limitation, distance between processing stations, average speed between processing stations, available transportation equipment between processing stations, average load and unload time at processing stations, traffic conditions, and weather. Values for variables which represent the routing optimization factors are maintained in a separate database which is updated as conditions change and is accessible to the global computer server every time it calculates and re-calculates an optimal route for any given article in the system. Whenever an article arrives at a processing station, the optimization software conducts a check of the database of routing variables and if any changes have occurred since the most recent route optimization, a new optimal route is calculated for the article. In this fashion, the system allows for automatic route adjustments to account for fast-changing conditions which allows for much more efficient routing of articles than that allowed by a static route.

In the preferred embodiment of the present invention, the global database of routing and tracking information maintains a separate record for each article handled by the system. The format for the global database is flexible so as to allow the addition of multiple kinds of identifiers to a single article record. The most basic identifier is an article tracking number which is incorporated on the article in a computer readable format, such as a bar code, and is unique to the article. A second type of identifier, a customer identifier, can be assigned manually by the shipper or recipient of the article in order to allow for more convenient tracking and routing of multiple articles or for ease of interfacing with existing accounting systems. A customer identifier may correspond to a particular purchase order, customer number, or client account. By using a customer identifier as the search criteria for the global database, a user can easily locate, track and control multiple packages sharing a common characteristic. Another type of identifier in the preferred embodiment of the present invention is a consolidation identifier, which, as its name implies, is associated with an article to denote it has been consolidated into a container. For the purposes of the present invention, a container is defined as a consolidated group of articles which has a common attribute such as its origination point, its destination point or its composition. Containers can themselves be included or "nested" within other containers or combined with other articles. When an article is consolidated with other articles into a container, the operator at the processing station will scan the article and the container and indicate that the container's identifier should be associated with the article. When this information is received by the global computer server, the container's identifier is added to the global database record for the article. Any handling activity thereafter performed on the subject article will automatically be reflected in the global database record for the subject article as well as the records for all other articles consolidated in the container. In order to allow for nested container consolidation, database article records may include more than one consolidation identifier. An article record which includes more than one consolidation identifier denotes an article which has been consolidated with other containers or articles into a container, which container has in turn been consolidated with other containers or articles into yet another container. In order to avoid duplicate record entries for tracking activity of articles in nested consolidation situations, in the preferred embodiment, activity for only the most recently entered consolidation identifier is added to the article's database record. Whenever an article is de-consolidated, the appropriate consolidation identifiers are de-associated from the article record, allowing the record to accurately show the tracking history of the article while no longer representing the articles current state. Once a consolidation identifier is de-associated from the article's database record, tracking of consolidated activity ceases for that article with regard to the container corresponding to the removed identifier.

In the preferred embodiment, all routing activities are centralized in the global computer server which, in turn, may be accessed and manipulated through an electronic communications network such as the Internet. In the preferred embodiment, an authorized user accesses the system from a personal computer through a standard Internet browser and enters the tracking number or customer identifier for the article or articles to be tracked. The authorized user is then be presented with a page showing the present status of the articles, tracking activity for each article, and the next scheduled stop along with an estimated time and date of delivery based on the most recent optimized routing. Using the browser, the user is then be able to modify routing options for each article or for the entire group of articles. The routing options may include, without limitation, canceling shipments in transit, changing the final destination of an article or articles, changing routing optimization variables by assigning more or less weight to factors such as average speed between processing stations, weather or traffic, requesting that articles be held at particular processing stations, requesting consolidation or de-consolidation of shipments, and requesting that a particular route be used regardless of optimization considerations. Any custom routing options entered by the user are then translated into a set of routing rules for the affected global database article records. At the next stop in each article's route, the global server will query the routing rules and take them into account when re-calculating the optimal route for each article. If no custom outing option's are specified by the user, the optimized route is re-calculated using a redetermined set of default routing rules.

In a preferred embodiment of the present invention, the routing and tracking system can detect an article which has been sent to an erroneous processing station and can take corrective action by generating a new optimized route for the article from said erroneous processing station. Since the local computer server at the processing station downloads identification information from the global computer server about every article scheduled to arrive at said processing station, upon arrival an scanning of the misdirected article, the handheld scanner, which has in turn downloaded the scheduled article information from the local computer server, will alert the operator that the article has been sent to the processing station in error. The operator can then accept the information and choose to return the article to the processing station from which it came or, alternatively, proceed to route the article normally from the present routing station to its final destination.

It will be understood by those skilled in the relevant art that while the preferred embodiment is directed towards a system for tracking and routing articles through processing stations at disparate geographic locations, alternative embodiments of the present invention may be utilized to track and articles through processing stations which are located in very close proximity to each other or even in the same building.

It will also be understood by those skilled in the relevant art that while the preferred embodiment refers to a computer environment which includes a single global computer server and a single local server at each processing station, alternative embodiments of the invention may include multiple global computer servers and multiple local servers at each processing station which alone or in combination perform essentially the same function as that of the global computer server and the local servers of the preferred embodiment.

Accordingly, it will be understood that the preferred embodiment of the present invention has been disclosed by way of example and that other modifications and alterations may occur to those skilled in the art without departing from the scope and spirit of the appended claims.

What is claimed is:

1. A computer-implemented centralized system for optimally routing and tracking articles comprising:
   a global computer server accessible through an electronic communications network, said global server comprising: a global database containing a record of routing and tracking information for each article handled by the system; an optimizer for calculating, and periodically recalculating, an optimal route for each article handled by said system and for updating said global database with changes to said routing and tracking information; a database of route optimization factors accessible by said optimizer for use in said calculation and recalculation of said optimal route; a tracker enabling users of said system to review said tracking and routing information and to modify said route optimization factor database,
   a plurality of processing stations arrayed throughout a delivery area for said system,
   at each such processing station, a local computer server capable of periodically receiving from said global computer server identification, handling and routing instructions for each article to be processed at said processing station and periodically transmitting to said global computer server information regarding all handling activities performed on articles processed at said processing station,
   at each such processing station, one or more scanning devices capable of receiving from said local computer server article identification information, handling instructions and routing information, and also being capable of collecting identification and handling activity information for each article received at each said processing station and transmitting said identification and handling activity information to said local computer server, and
   transportation means capable of transporting articles between and among said processing stations, article origination points and article destination points.

2. A computer-implemented method for delivering an article using a centrally optimized tracking and routing system, the method comprising the steps of:
   at a first processing station, using a first scanner to collect article identification data and final destination data from said article,
   transmitting from said first scanner to a local computer at said first processing station, said article identification data and final destination data along with scanning time and date data,
   transmitting from said first processing station to a global computer server said article identification, time, date and final destination data, along with identification data for said first processing station,
   at said global computer server, incorporating said data transmitted from said first processing station into an article record at a global article information database,
   calculating an optimal route for transporting said article from said first processing station to said final destination and updating said article record with identification information for the first stop along said optimal route,
   transmitting from said global computer server to said local computer server said updated article record,
   transmitting said updated article record to said first scanner or a second scanner at said first processing station,
   scanning said article with said first or second scanner and displaying said first stop identification information for said package,
   transporting said package from said first processing station to said first stop,
   if said first stop is hot also said final destination, repeating the above steps at said next stop until said package is delivered at said final destination.

3. The method of claim 2, further comprising a step of affixing to said article a computer readable indicia including said article identification data and said final destination data.

4. The method of claim 2, wherein said updated package record information includes consolidation information, the method further comprising a step of processing the article responsive to the consolidating information.

5. The method of claim 2, wherein said updated package record information includes a pick up location and pick up time.

6. The method of claim 2, wherein calculating an optimal route comprises calculating an optimal route based on a plurality of routing factors, the method further comprising updating the plurality of routing factors.

7. The method of claim 2 further comprising a step of determining, whenever said article is scanned, whether said article has been misrouted and calculating a new route if said article has been misrouted.

8. The method of claim 2 further comprising a step of scanning said article with a third scanner when said article is delivered to said final destination.

9. The method of claim 2 further comprising a step of changing said final destination of said article and recalculating said optimal route based on said changed final destination.

10. A method of directing the movement of a plurality of items through a network of interconnected processing stations, the method comprising:
    associating an identifier with each of the plurality of items, wherein the identifier is provided on each item in a computer readable form;
    reading the identifier on each item arriving at a processing station with a scanner associated with the processing station, said identifier being stored in the scanner;
    periodically synchronizing information stored in a scanner with information stored at the processing station associated with the scanner;
    periodically synchronizing information stored in each of the processing stations with a central server;
    determining, at the central server, a desired path of movement for each item through the network of interconnected processing stations, the desired paths of movement being provided to each processing station and each scanner when it periodically synchronizes with the central server and its associated processing station, respectively;

storing at the central server data about each item including its location and its desired path of movement;

providing information about a next processing station on a desired path for an item whenever the identifier on the item is scanned; and directing the item to the next processing station responsive to the provided information.

11. The method of claim 10, wherein the reading, determining, providing, and directing are repeated for an item until the item arrives at a desired final destination.

12. The method of claim 10, wherein determining a desired path of movement comprises determining an optimized path of movement responsive to a plurality of optimization factors.

13. The method of claim 12 further comprising periodically updating the optimization factors.

14. The method of claim 12 wherein the optimization factors include at least one of the following:

an indication of the time to move an item from one processing station to another;

an indication of the time to process an item at each processing station; and an indication of environmental conditions affecting movement of an item from one processing station to another.

15. The method of claim 10 further comprising:

reading the identifier on an item with a scanner upon delivery of the item to a desired final destination; and indicating at the central server that the item has reached the desired final destination.

16. A computerized system for optimally routing and tracking articles comprising:

a global computer server accessible through an electronic communications network, said global server comprising:

a global database containing a record of routing and tracking information for articles handled by the system;

an optimizer for calculating, and periodically recalculating, an optimal route for the articles handled by said system and for updating said global database with changes to said routing and tracking information;

a database of route optimization factors accessible by said optimizer for use in said calculation and recalculation of said optimal route; and an interface enabling users of said system to review said routing and tracking information and to modify said route optimization factor database, a plurality of processing stations, each including:

a local computer server programmed to intermittently receive from said global computer server handling and routing information for articles to be processed at said processing station and to intermittently transmit to said global computer server information regarding the handling and routing of articles processed at said processing station, and a scanning device in communication with said local server, said scanning device programmed to receive from said local computer server handling and routing information for each article to be processed at said processing station, to display said received handling and routing information for an article when the article is scanned, to collect handling and routing information for scanned articles, and to transmit said collected handling and routing information to said local computer server.

17. The system of claim 16, wherein routing and tracking information includes:

an article tracking number;

a customer number;

an identification of a next processing station; and a destination identifier.

18. The system of claim 17, wherein the routing and tracking information further includes a consolidation identifier.

19. The system of claim 17, wherein routing and tracking information includes a plurality of optional consolidation identifiers.

20. The system of claim 16, wherein the database of route optimization factors includes information about at least one of the following factors:

distances between processing stations;

average speed between processing stations;

available transportation equipment;

average processing time at each processing station;

traffic conditions; and weather.

21. A computer system for optimally routing items of interest through a plurality of processing stations and tracking the progress of said item of interest, the system comprising:

a global computer server, said global computer including:

a global database for storing information regarding the identification, routing, and tracking for each item of interest;

an optimizer for calculating, and periodically recalculating, an optimal route for each item of interest, and for updating routing information in said global database;

a database for storing route optimization factors for use by said optimizer in said calculation and recalculation of said optimal routes;

an interface for outputting identification, routing, and tracking information to users of said computer system and for receiving modifications of said route optimization factors;

wherein said global computer server intermittently transmits handling and routing instructions about items of interest to a local server at each of the plurality of processing stations, the local server storing the handling and routing instructions for subsequent transmission to a scanning device associated with a processing station, and wherein said global computer intermittently receives from said local server at each of the plurality of processing stations and stores in said global database information regarding the identification, routing, and tracking data of items of interest processed at said processing station, said local server receiving said information regarding the identification, routine and tracking of items processed at said processing station from said scanning, device.

22. The system of claim 21 wherein the identification, routing, and tracking information for each item of interest includes:

an article tracking number;

a customer number;

an identification of a next processing station; and a destination identifier.

23. The system of claim 22, wherein the identification, routing, and tracking information further includes a consolidation identifier.

24. The system of claim 21, wherein the identification, routing, and tracking information for each item of interest includes a plurality of optional consolidation identifier.

25. The system of claim 21, wherein the database of route optimization factors includes information about at least one of the following factors:
- distances between processing stations;
- average speed between processing stations;
- available transportation equipment;
- average processing time at each processing station;
- traffic conditions; and
- weather.

26. The system of claim 21 wherein each of the local computer servers periodically communicates with the global server over an electronic communications network.

27. The system of claim 21, wherein said scanners are in wireless communication with said local server at said processing station.

28. A system of claim 21 wherein said optimizer determines whether to consolidate or deconsolidate items of interest.

29. The system of claim 28, wherein routing and tracking information includes:
- an article tracking number;
- a customer number;
- an identification of a next processing station;
- a destination identifier; and optionally includes:
  - a consolidation identifier.

30. The system of claim 28, wherein the database of route optimization factors includes information about at least one of the following factors:
- distances between processing stations;
- average speed between processing stations;
- available transportation equipment;
- average processing time at each processing station;
- traffic conditions; and
- weather.

* * * * *

UNITED STATES PATENT AND TRADEMARK OFFICE
CERTIFICATE OF CORRECTION

PATENT NO.      : 6,795,823 B1
DATED           : September 21, 2004
INVENTOR(S)     : Alex Aklepi et al.

It is certified that error appears in the above-identified patent and that said Letters Patent is hereby corrected as shown below:

<u>Title page,</u>
Item [*] Notice, delete "491", insert -- 498 --.

<u>Column 11,</u>
Line 60, after "computer", insert -- server --.

<u>Column 12,</u>
Line 18, delete "hot", insert -- not --.

<u>Column 14,</u>
Line 55, delete "routine", insert -- routing --.

Signed and Sealed this

Sixth Day of September, 2005

JON W. DUDAS
*Director of the United States Patent and Trademark Office*